United States Patent
Inoue et al.

(10) Patent No.: US 7,410,217 B2
(45) Date of Patent: Aug. 12, 2008

(54) VEHICLE SEAT LOCK

(75) Inventors: Hisashi Inoue, Nagoya (JP); Shigeo Kakuta, Yokohama (JP); Naoya Seto, Yokohama (JP); Masahito Minoura, Okazaki (JP); Shinji Suzuki, Miyoshi-cho (JP)

(73) Assignee: Mitsui Mining and Smelting Co. Ltd. (JP)

( * ) Notice: Subject to any disclaimer, the term of this patent is extended or adjusted under 35 U.S.C. 154(b) by 0 days.

(21) Appl. No.: 11/625,875

(22) Filed: Jan. 23, 2007

(65) Prior Publication Data

US 2007/0200411 A1    Aug. 30, 2007

(30) Foreign Application Priority Data

Jan. 23, 2006   (JP)   ............... 2006--014328

(51) Int. Cl.
*B60N 2/36*    (2006.01)
(52) U.S. Cl. .................................. 297/378.13
(58) Field of Classification Search ............. 297/378.13
See application file for complete search history.

(56) References Cited

U.S. PATENT DOCUMENTS

| | | | | |
|---|---|---|---|---|
| 4,684,175 A * | 8/1987 | Trutter | ................ | 297/378.13 |
| 4,721,338 A * | 1/1988 | Kondo | ................ | 297/378.13 |
| 4,765,682 A * | 8/1988 | Satoh | ................ | 297/378.13 |
| 4,904,003 A * | 2/1990 | Yamazaki et al. | ... | 297/378.13 X |
| 4,909,571 A * | 3/1990 | Vidwans et al. | ..... | 297/378.13 X |
| 5,566,431 A * | 10/1996 | Haglund | ............ | 297/378.13 X |
| 5,664,839 A * | 9/1997 | Pedronno et al. | ........ | 297/378.13 |
| 5,700,056 A * | 12/1997 | Bernard | .............. | 297/378.13 |
| 5,762,401 A * | 6/1998 | Bernard | ................ | 297/378.13 |
| 5,855,414 A * | 1/1999 | Daniel et al. | ............ | 297/378.13 |
| 6,312,055 B1* | 11/2001 | Uematsu | ................ | 297/378.13 |
| 6,341,820 B1* | 1/2002 | Kimura et al. | ......... | 297/378.13 |
| 6,547,302 B1* | 4/2003 | Rubio et al. | ......... | 297/378.13 X |
| 6,705,679 B1* | 3/2004 | Zelmanov et al. | ...... | 297/378.13 |
| 6,733,078 B1* | 5/2004 | Zelmanov | ........... | 297/378.13 X |
| 6,769,741 B2* | 8/2004 | Denning | ................ | 297/378.13 |
| 6,786,551 B2* | 9/2004 | Brewer et al. | ........ | 297/378.13 X |
| 7,032,973 B2* | 4/2006 | Reubeuze | .............. | 297/378.13 |

(Continued)

FOREIGN PATENT DOCUMENTS

JP        61057436 A  *  3/1986  ............ 297/378.13

(Continued)

*Primary Examiner*—Rodney B. White
(74) *Attorney, Agent, or Firm*—Ostrolenk, Faber, Gerb & Soffen, LLP

(57) ABSTRACT

In a vehicle seat lock, an operating knob is provided at the top of the seat back of a chair. The operating knob is joined to the inner end of the bell crank at the lower end. The bell crank is pivotally secured to a bracket in the seat back. The outer end of the bell crank has the first and second elongate openings. The upper end of the first connecting rod slidably engages in the first elongate opening, and the upper end of the second connecting rod slidably engages in the second elongate opening. The lower end of the first connecting rod is coupled to a sensing member which detects invasion of the striker. The lower end of the second connecting rod is coupled to an opening lever which allows a hook member to disengage from a striker fixed to the vehicle body.

5 Claims, 13 Drawing Sheets

U.S. PATENT DOCUMENTS

| | | | |
|---|---|---|---|
| 7,044,552 B2 * | 5/2006 | Muller et al. | 297/378.13 X |
| 7,152,926 B2 * | 12/2006 | Wrobel | 297/378.13 |
| 7,188,906 B2 * | 3/2007 | Christoffel et al. | 297/378.13 |
| 2004/0007909 A1 * | 1/2004 | Bonk | 297/378.13 |
| 2004/0262973 A1 * | 12/2004 | Reubeuze et al. | 297/378.13 |
| 2005/0023877 A1 * | 2/2005 | Vermeulen | 297/378.13 |
| 2005/0194826 A1 * | 9/2005 | O'Callaghan et al. | 297/378.13 |

FOREIGN PATENT DOCUMENTS

| | | |
|---|---|---|
| JP | 8-119010 | 5/1996 |

\* cited by examiner

VEHICLE SEAT LOCK

BACKGROUND OF THE INVENTION

The present invention relates to a vehicle seat lock to hold the seat back of a chair in a standing position, the seat back being capable of standing up or falling down.

JP8-119010A discloses a vehicle seat lock comprising a hook member mounted to the seat back and engagable with striker of a vehicle body, a locking mechanism comprising a latch member engagable with the hook member, an unlocking knob connected to the latch member and a warning indicator. By the unlocking knob, the latch member is disengaged from the hook member to allow the seat back to move from a standing position to a falling position.

The warning indicator is retracted in the seat back when the hook member engages with the striker, while it projects from the seat back when the hook member disengages from the striker. Thus, a passenger visually confirms engagement of the hook member with the striker by the warning indicator.

However, in the vehicle seat lock, the warning indicator for showing the engagement of the hook member with the striker is separately provided from the unlocking knob thereby increasing the number of parts and making the structure more complicate.

SUMMARY OF THE INVENTION

In view of the disadvantages in the prior art, it is an object of the invention to provide a vehicle seat lock to enable a single operating member to play two roles in showing whether or not a hook member engages with a hook member and enabling the hook member to disengage from the striker.

BRIEF DESCRIPTION OF THE DRAWINGS

The features and advantages of the invention will become more apparent from the following description with respect to embodiments as shown in the accompanying drawings wherein.

DETAILED DESCRIPTION OF PREFERRED EMBODIMENTS

Figure 1:
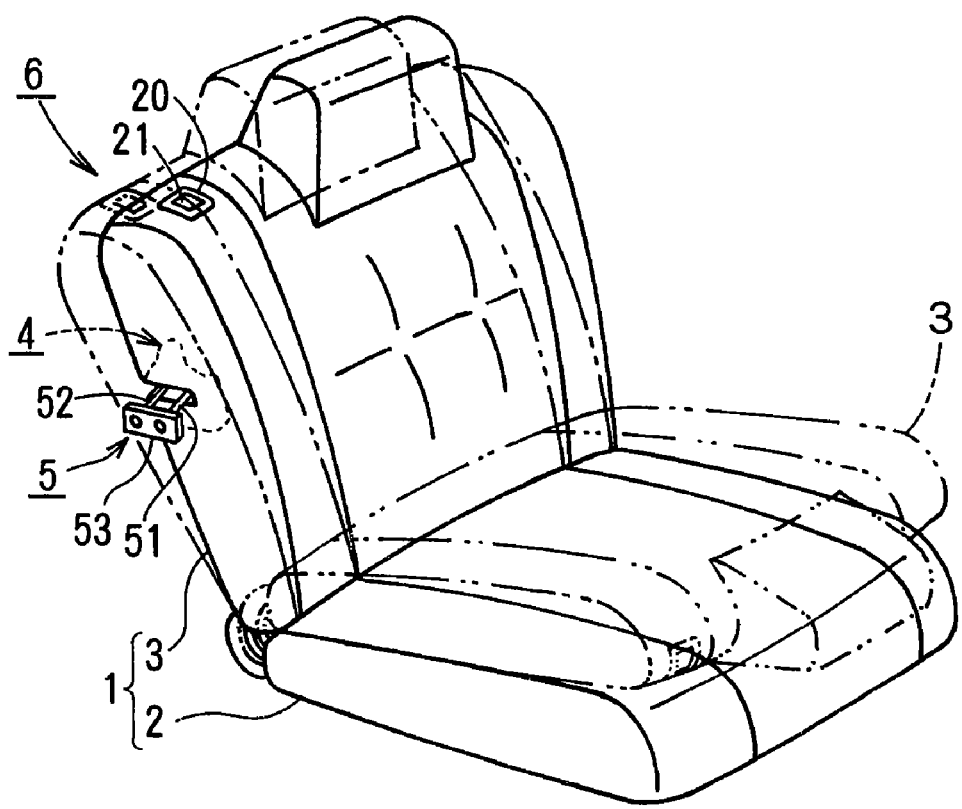
FIG. 1 is a perspective view of a rear seat for a vehicle including the present invention.

As shown in FIG. 1, a rear seat 1 comprises a seat cushion 2 mounted on a body floor, and a seat back 3 which is supported by a hinge shaft (not shown) at the rear end of the seat cushion 2 to enable the seat back 3 to fall down on the seat cushion 2

In the seat back 3, a locking assembly 4 is provided below a shoulder part close to a body panel and engages with a metal striker 5 fixed to the body panel to enable the seat back 3 to be held at the first standing position by a solid line and at the second standing position reclined backwards of the first standing position by a dotted line and to enable the seat back 3 to fall down forwards with operation of an operating device 6 in the shoulder part of the seat back 3.

The striker 5 comprises a base 53 fixed to the body panel facing the side of the seat back 3, and a U-shaped engaging member 54 comprising the first engagement portion 51 and the second engagement portion 52.

Figure 4:
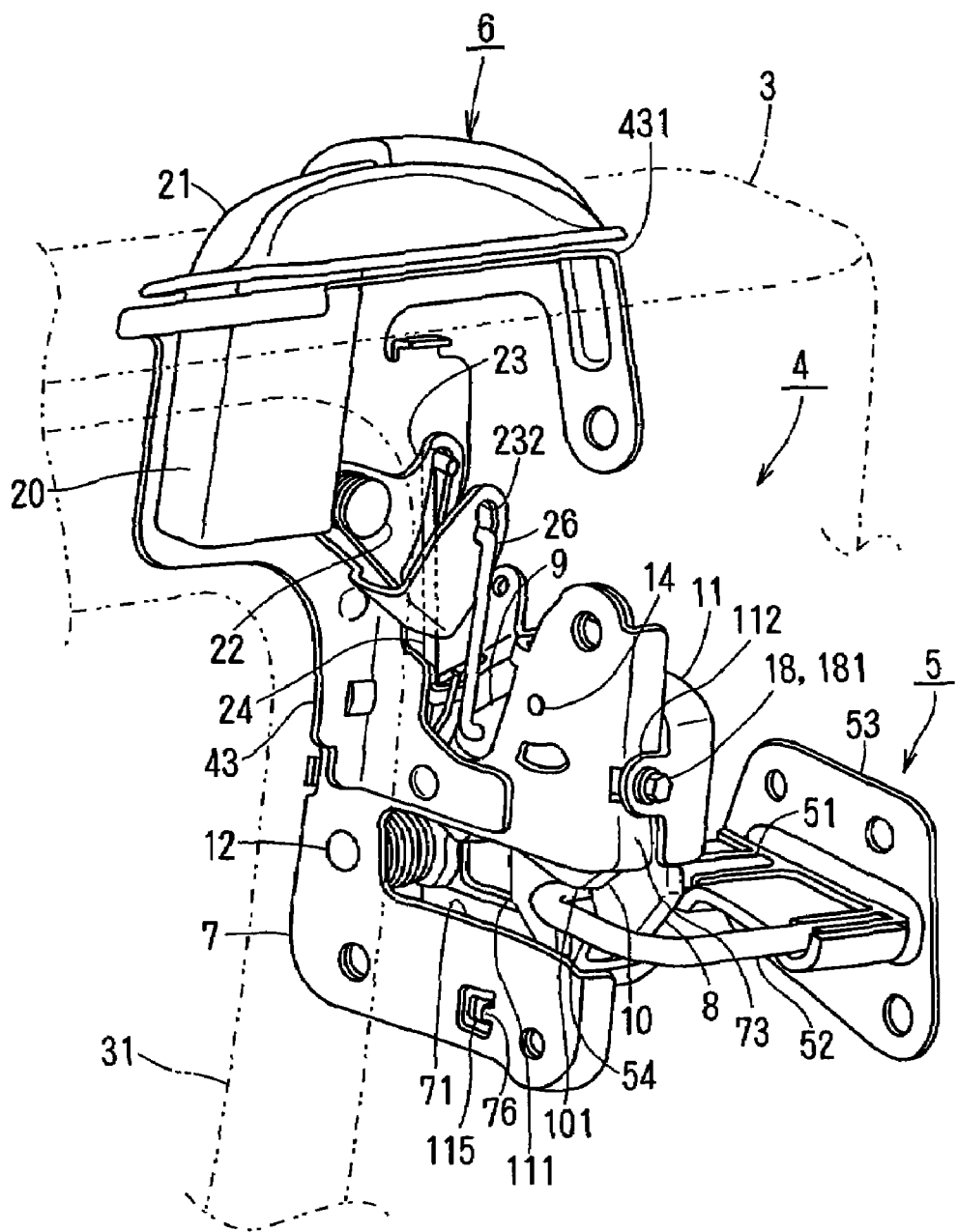
FIG. 4 is a rear perspective view of the locking assembly.
Figure 5:
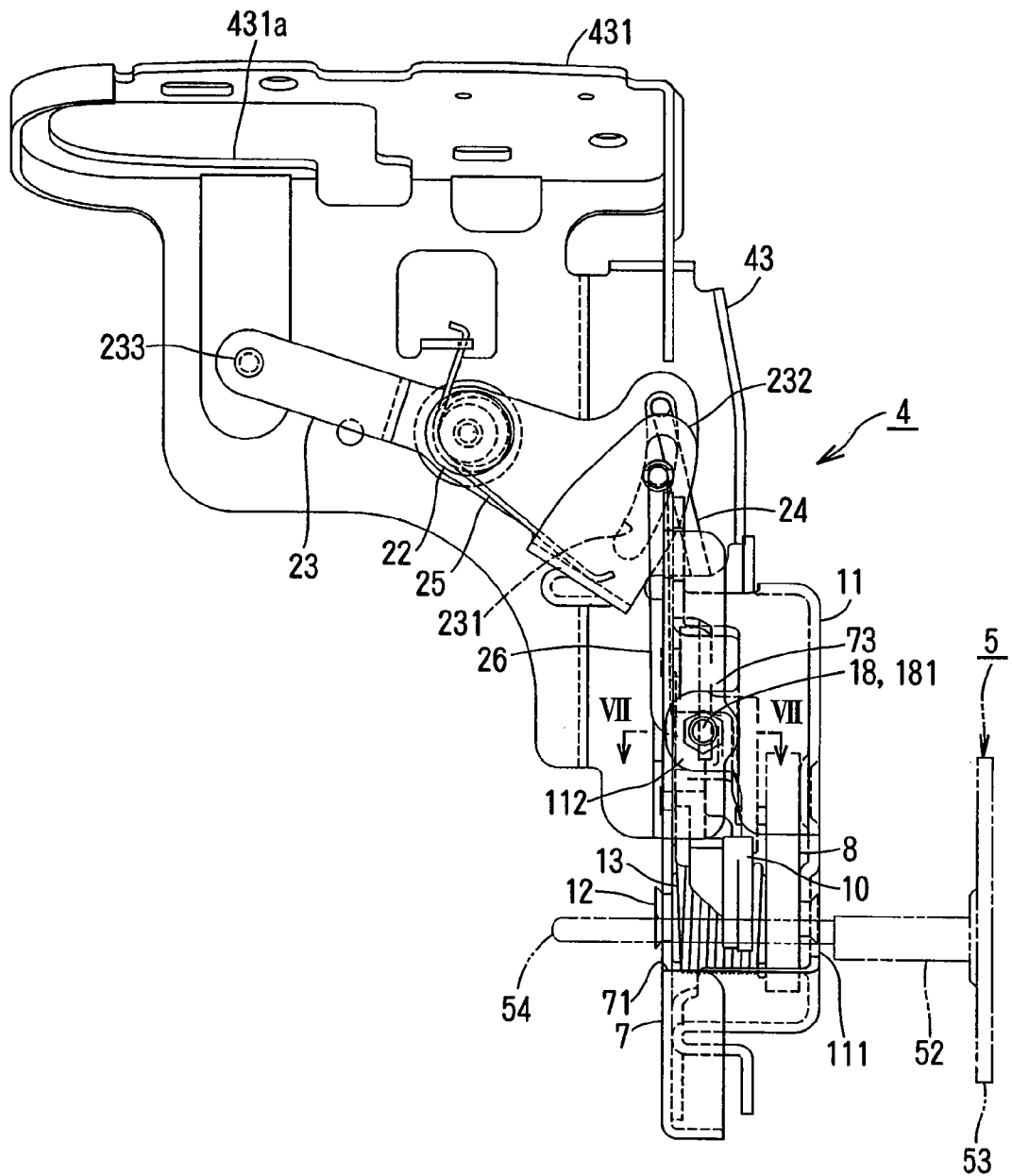
FIG. 5 is a side view of the locking assembly.

In FIG. 4, the locking assembly 4 comprises the first metal base member 7 fixed to a seat frame 31 in FIG. 4 in the seat back 3 with a bolt (not shown), and the second metal base member 11 fixed to the side of the first metal member 7 facing an outside. The first and second base members 7,11 have striker-engaging grooves 71,111 in which the first and second engagement portions 51,52 of the striker 5 engage forwards when the seat back 3 stands up.

Between the first base member 7 and the second base member 11, there are disposed a hook member 8 containing metal as matrix to engage with the first or second engagement portions 51,52 of the striker 5 to allow the seat back 3 to be held at the first or second standing position, a synthetic-resin opening lever 9 operated by the operating device 6, and a synthetic-resin sensing member 10 movable depending on engagement of the striker 5 and the hook member 8.

To a metal mounting bracket 43 fixed on the first base member 7, an operating device 6 and a bell crank 23 are mounted. The mounting bracket 43 may be molded together with the first base member 7. The operating device 6 may be mounted to the second base member 11.

As shown in FIG. 4, above the striker-engagement grooves 71,111 of the first and second base members 7,11, there are provided the first fixing member 73 and the second fixing member 112 connected to each other with a bolt 18.

Figure 7:
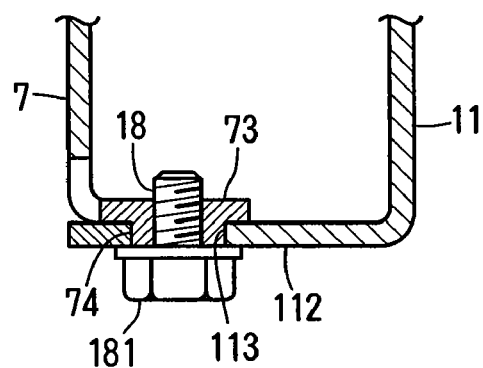
FIG. 7 is a horizontal sectional view taken along the line VII-VII in FIG. 5.

As shown in FIG. 7, a burring 74 that cylindrically projects rearwards or downwards in FIG. 7, from the first fixing portion 73. On the inner circumferential surface of the burring 74, a female thread is formed to engage with the bolt 18.

In the second fixing portion 112 on the rear surface of the first fixing portion 73, there is an engagement hole 113 in which the burring 74 engages.

To connect the first base member 7 to the second base member 11, the burring 74 of the first fixing portion 73 engages in the engagement hole 113 of the second fixing portion 112. In this condition, the bolt 18 is screwed in the burring 74. As shown in FIG. 7, the second fixing portion 112 is held between a head 181 of the bolt 18 and the first fixing portion 73. By connecting opening sides of the striker-engaging grooves 71,111 of the first and second base members 7,11, deformation of the first and second base members 7,11 can be effectively prevented when high load acts to the seat back 3. As a result, by preventing deformation of the hook member 8, locking strength of the locking assembly 4 can be improved.

The first base member 7 is connected to the second base member 11 after the opening lever 9, the sensing member 10 and the bell crank 23 are mounted to the first base member 7 and after the hook member 8 is mounted to the second base member 11.

Figure 6:
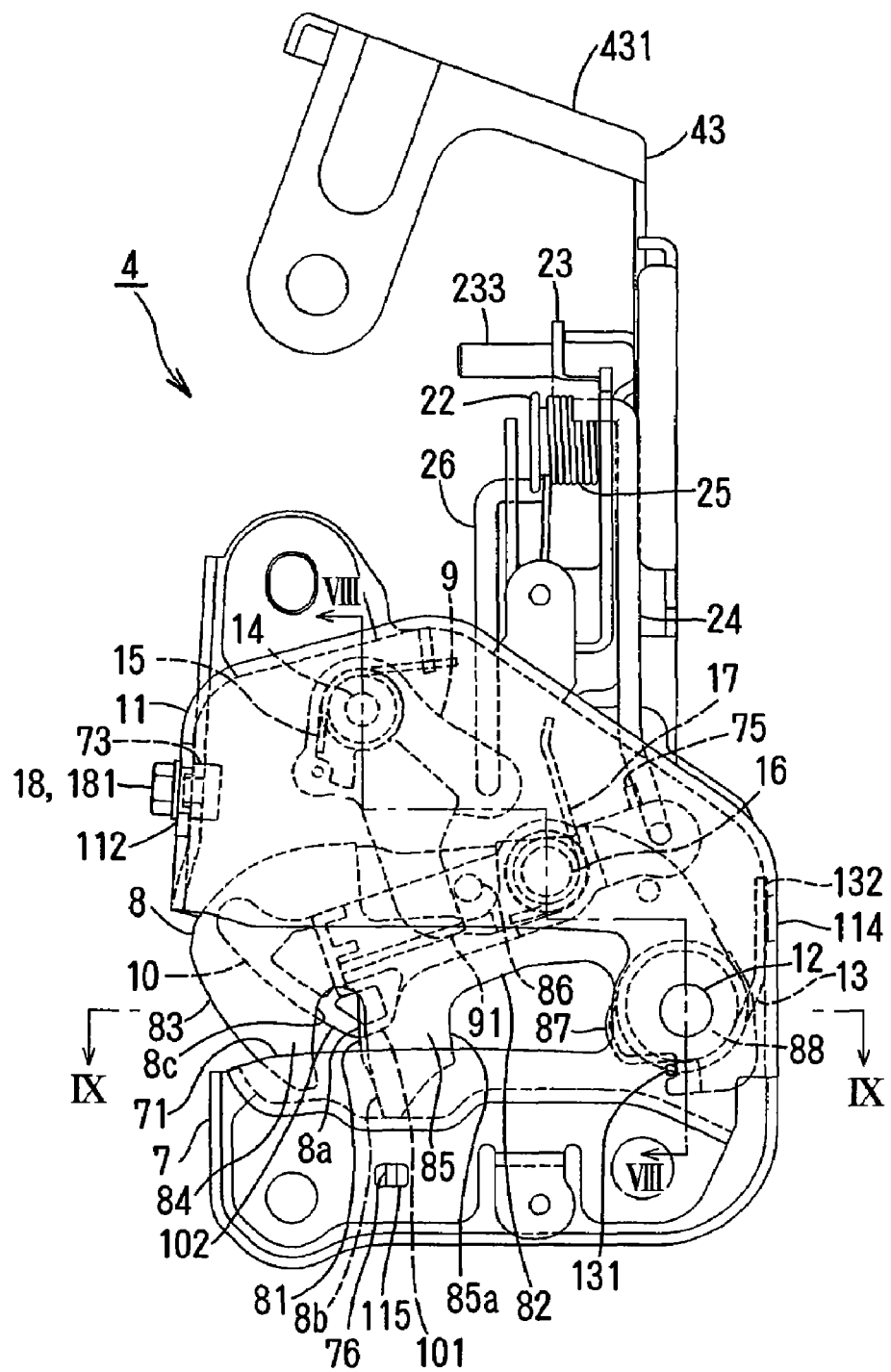
FIG. 6 is a side view of the locking assembly.
Figure 8:
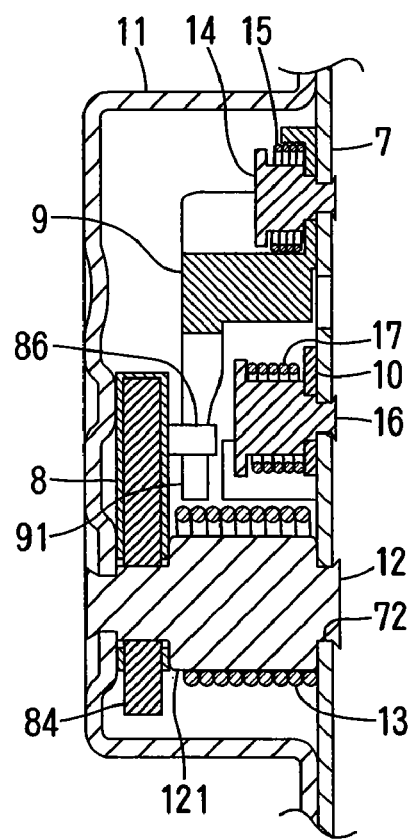
FIG. 8 is a vertical sectional view taken along the line VIII-VIII in FIG. 6.
Figure 9:
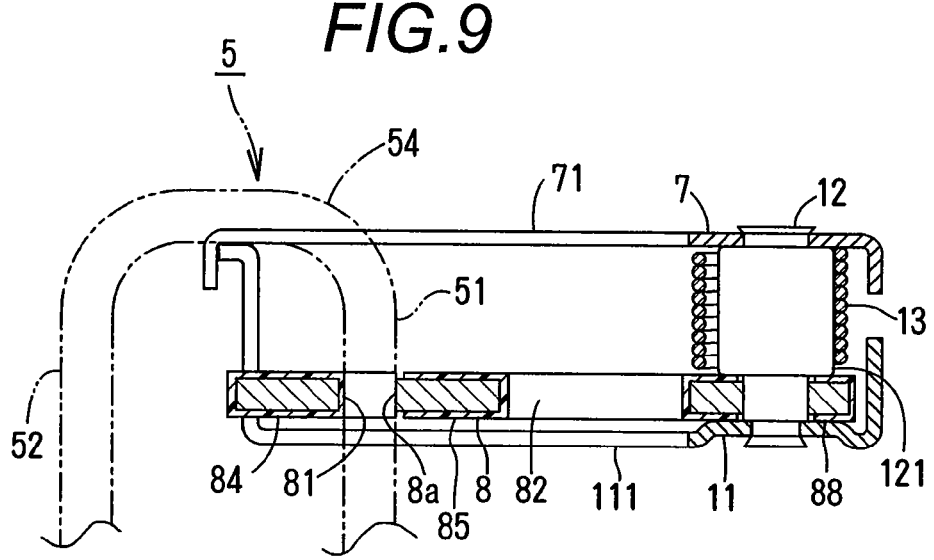
FIG. 9 is a horizontal sectional view taken along the line IX-IX in FIG. 6.
Figure 10:
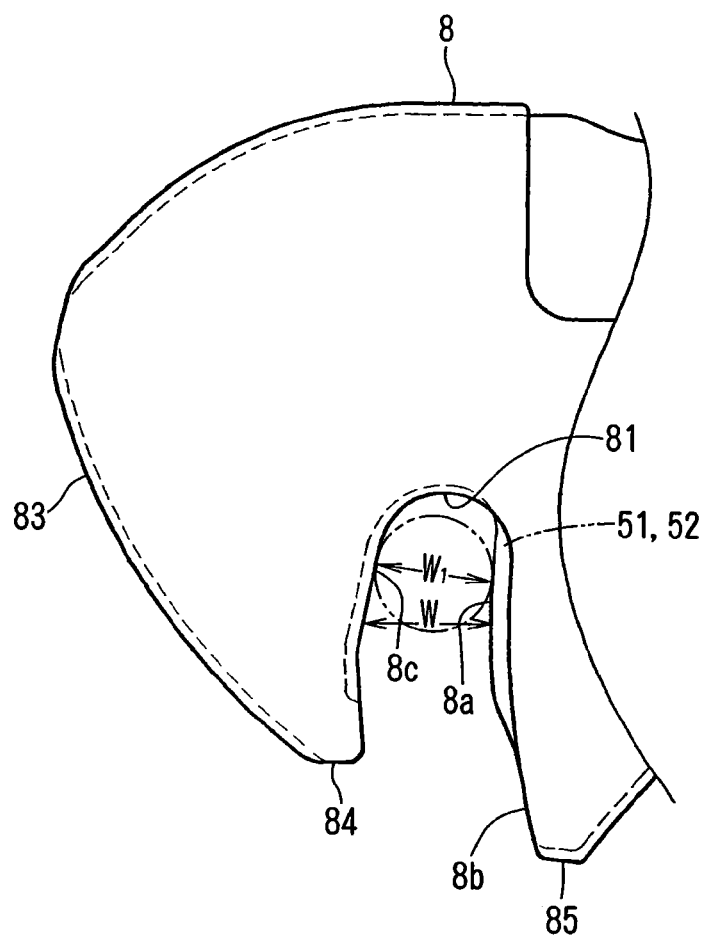
FIG. 10 is an enlarged view of a hook member.

FIG. 8 is a vertical sectional view taken along the line VIII-VIII in FIG. 6; FIG. 9 is a horizontal sectional view taken along the line IX-IX; FIG. 10 is an enlarged view of the hook member 8; and FIGS. 11-15 are views for showing operation.

In FIGS. 11-15, the operating device 6, the bell crank 23, the hook member 8, the opening lever 9 and the sensing member 10 are on the same surface. Thus, in the operating device 6 and the bell crank 23, the front of the figures is deemed as "rear side", and the back is deemed as "front side". In the hook member 8, the opening lever 9 and sensing member 10, the left side of the figures is deemed as "rear side" and the right side is deemed as "front side".

The hook member 8 is molded with synthetic resin on the outer circumferential surface of metal. A pivot portion 88 is pivotally secured on the first pivot 12 in the striker-engaging groove 111 of the second base member 11 to enable it to move up and down. The pivot portion 88 is forced by the first spring 13 to go down. The first pivot 12 is positioned on an extension of movement of the striker 5.

As shown in FIG. 6, the first spring 13 has one end 131 which engages with the hook member 8 and the other end 132 which engages with a projection 114 of the second base member 11. As shown in FIGS. 8 and 9, the first pivot 12 has a larger-diameter portion 121 between the first base member 7 and the second base member 11.

The hook member 8 has the first engagement groove 81 opening downwards and capable of selectively engaging with the first and second engagement portions 51,52; and the second engagement groove 82 capable of engaging with the first engagement portion 51. The first arm 84 having an inclined edge 83 is provided in the hook member 8 and the second arm 85 is provided between the first engagement groove 81 and the second engagement groove 82. From the side of the hook member 8, a protrusion 86 projects towards the cabin.

Figure 11:
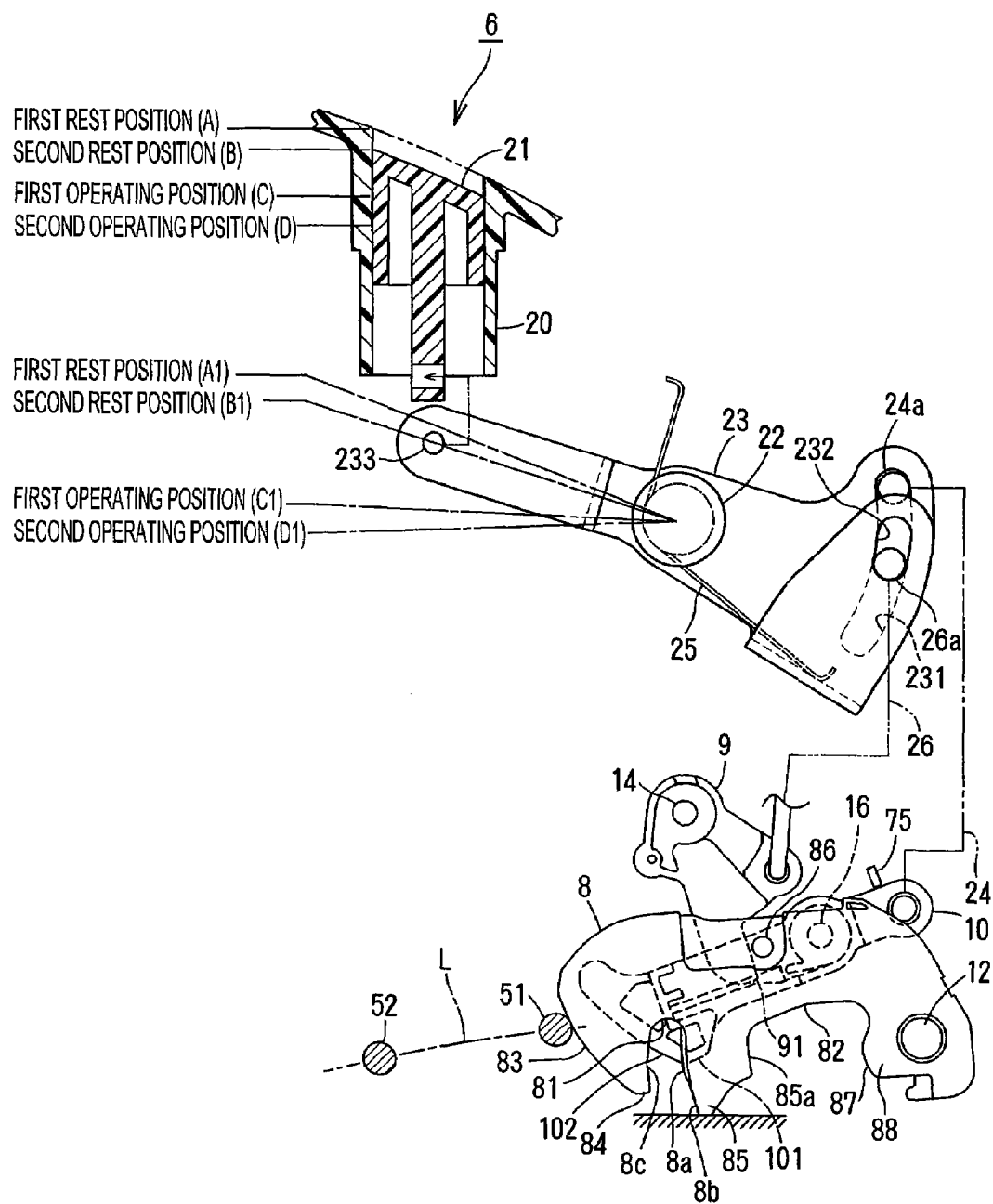
FIG. 11 is a view showing an action of main parts when an operating knob is in the second rest position.

When the hook member 8 disengages from the striker 5 or when the seat back 3 folds down, it is held horizontally in a standby position in FIGS. 6 and 11. When the first engagement portion 51 or the second engagement portion 52 of the striker 5 engages in the first engagement groove 81, the hook member 8 is held in an engagement position where it slightly rotates upwards from the standby position in FIG. 12 or 15. According to operation of the operating device 6 to the first operating position (C) below, the hook member 8 rotates in an unlocking direction or a clockwise direction in FIGS. 6 and 11-15 to shift to the first-step unlocking position in FIG. 13 in which the first engagement portion 51 is releasable from the first engagement groove 81 only rearwards.

Furthermore, according to operation of the operating device 6 to the second operating position (D) below, the hook member 8 rotates upwards from the first-step unlocking position and enables it to shift to the second-step unlocking position in FIG. 14 in which the first engagement portion 51 can engage in the second engagement groove 82 from the first engagement groove 81.

When the seat back 3 is held in the first standing position, the first engagement portion 51 of the striker 5 engages in the first engagement groove 81 of the hook member 8, and when it is held in the second standing position, the second engagement portion 52 engages in the first engagement groove 81 and the first engagement portion 51 puts in the second engagement groove 82 with play.

The first and second arms 84,85 project downwards to put on the inner side surface of the second base member 11, and the lower end of the second arm 85 is allowed to contact the lower surface of the second base member 11 when the hook member 8 is in the standby position.

As shown in FIG. 10, the first engagement groove 81 is formed like a wedge to reduce a width upwards gradually. A width (W1) is set to put the striker 5 between the engagement portions 51 and 52 without loosening. Thus, the first engagement groove 81 tightly fits in the first engagement portions 51 and 52 thereby preventing the seat back 3 from moving back and forth.

A receiving edge 8a of the first engagement groove 81 contacts the first and second engagement portions 51,52 of the striker 5 when the seat back 3 is leaned backwards. On the rear edge of the second arm 85 which comprises the receiving edge 8a and a contact portion 8b continuous with the receiving edge 8a, metal matrix is exposed without synthetic resin molding.

The front edge of the first arm 84 comprises the inclined edge 83 of the first arm 84 and a coming-out preventing edge 8c which faces the receiving edge 8a of the first engagement groove 81. The coming-out-preventing edge 8e contacts the first and second engagement portions 51,52 when the seat back 3 falls down and folds on the seat. The front edge is molded with synthetic resin.

Immediately before the first or second engagement portion 51 or 52 of the striker 5 engages in the first engagement groove 81 of the hook member 8, metal parts contacts each other. Even though the hook member 8 is molded with synthetic resin, deformation of synthetic resin over the parts does not prevent the hook member 8 from moving out. Thus, the first engagement portion 51 does not engage in the second engagement groove 82 beyond the first engagement groove 81.

When the first and second engagement portions 51,52 engages in the first engagement groove 81, the metal-exposing receiving edge 8a can receive weight of the leaning seat back 3 when a passenger sits down the rear seat 1. Even though the hook member 8 is molded with synthetic resin, neither fast collapse nor deformation of the synthetic resin is prevented thereby assuring stable engagement of the hook member 8 with the striker 5 for a long time.

When the passenger leans against the seat back 3 or when weight is applied to the seat cushion 2, one needs to operate an operating knob 21. Load can be received by the receiving edge 8a of the hook member 8, so that the hook member 8 is unlikely to rotate in an unlocking direction without deformation of synthetic resin. Synthetic resin is not applied to the rear edge or the receiving edge 8a and contact portion 8b of the second arm 85. Thus, when the operating knob 21 is operated, synthetic resin is not caught to decrease the change in operation ensuring suitable operation.

When the first and second engagement portions 51,52 of the striker 5 goes into the striker-engaging grooves 71,111 to contact the inclined edge 83 of the hook member 8, noise is relieved with the synthetic resin part.

The second engagement groove 82 is formed between the second arm 85 and the pivot portion 88 pivotally supported by the first pivot 12. When the first engagement portion 51 of the striker 5 engages in the second engagement groove 82 in the second standing position of the seat back 3, the width is determined not to allow the first engagement portion 51 to engage with the second engagement groove 82.

A front edge 85a of the second arm 85 comprises an arc of a circle around the first pivot 12 as a center. At the rear edge of the pivot portion 88, there is formed a buffer portion 87 molded with synthetic resin.

The front edge 85a of the second arm 85 is formed as an arc of a circle around the first pivot 12 as center. When the seat back 3 is held in the second standing position, forward excessive load acts to the seat back 3 via a seat belt connected to the seat back 3. Even if the second engagement portion 52 is deformed to go out of the first engagement groove 81, the first engagement portion 51 contacts the front edge 85a of the second arm 85 in a substantially perpendicular direction, so that the first engagement portion 51 neither press up the second arm 85 nor rotates the hook member 8 in an unlocking direction. Thus, the present invention affects locking strength even in engagement relationship of the first engagement portion 51 and the second engagement portion 82, so that the seat back 3 can be held firmly in the second standing position.

Figure 12:
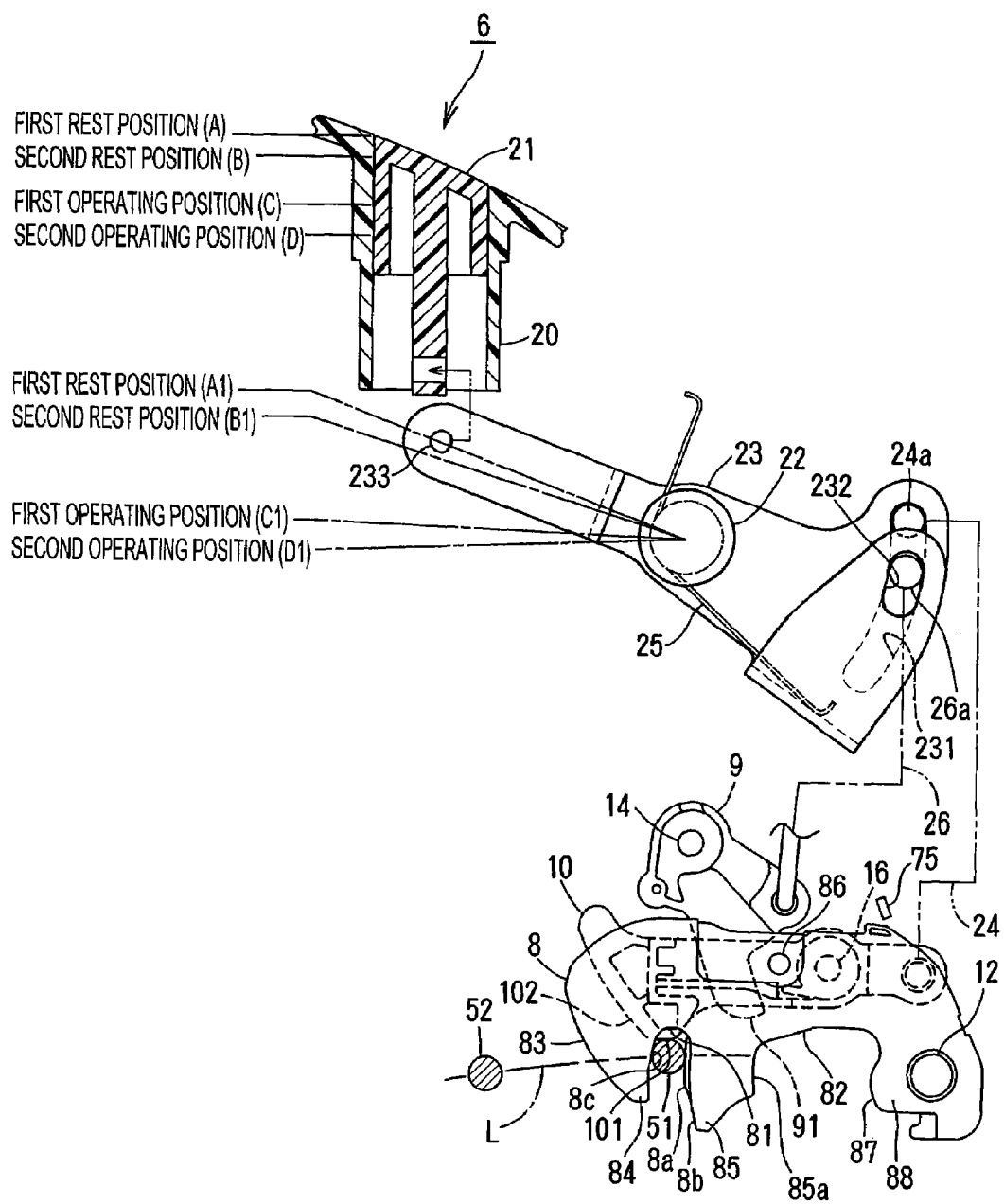
FIG. 12 is a view showing an action of main parts when the operating knob is in the first rest position.
Figure 14:
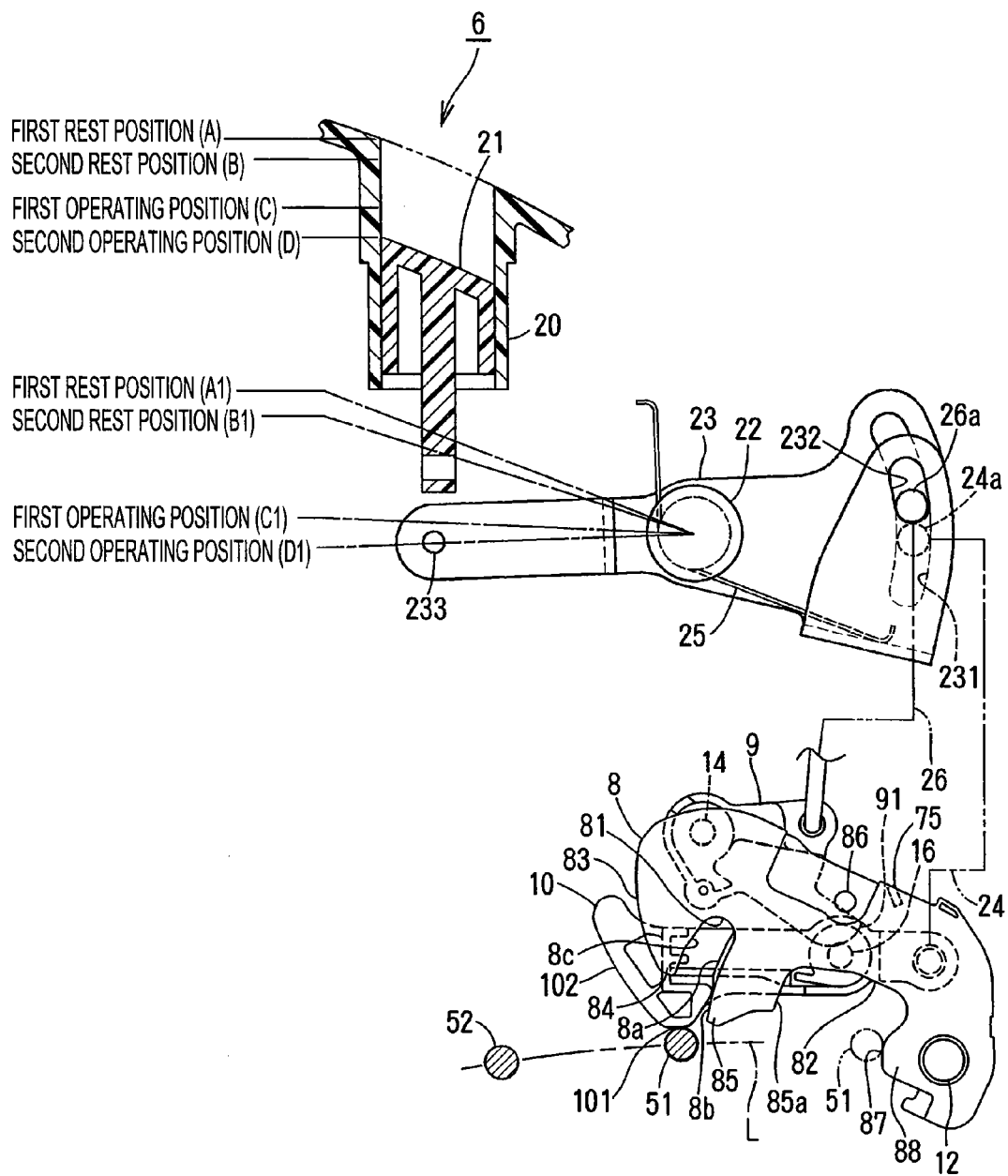
FIG. 14 is a view showing an action of main parts when the operating knob is in the second rest position.
Figure 15:
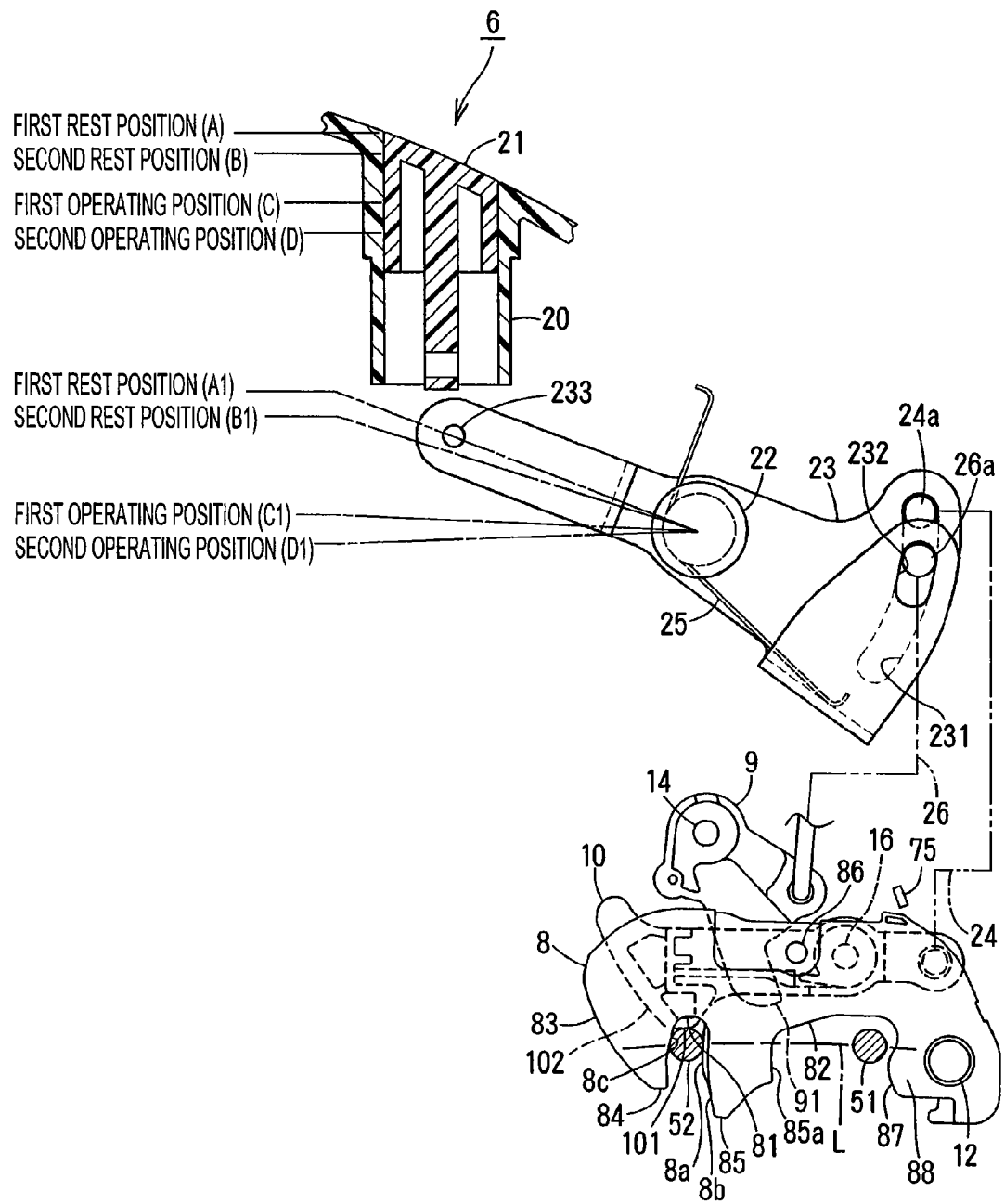
FIG. 15 is a view showing an action of main parts when the operating knob is in the first rest position.

The buffer portion 87 is positioned out of the movement track L of the first and second engagement portions 51,52 of the striker 5 when the hook member 8 is in an engagement position in FIGS. 12 and 15. The buffer portion 87 moves into the movement track L when the hook member 8 shifts to the second-step unlocking position in FIG. 14. Thus, when the first engagement portion 51 comes into the second engagement groove 82 of the hook member 8, the first engagement portion 51 contacts the buffer portion 87 to restrict invasion of the striker 5 and to reduce noise when the striker 5 comes in. The hook member 8 rotates from the second-step unlocking position in a direction of engagement or in an anticlockwise direction in FIGS. 6 and 11-15 to shift to the engagement position to allow the buffer portion 87 to shift out of the movement track L to go away from the first engagement portion 51. Without subjecting to variation in distance between the first engagement portion 51 and the second engagement portion 52 of the striker 5 or to errors in a mounted position of the locking assembly 4, the first engagement groove 81 can surely engage with the second engagement portion 52.

The buffer portion 87 may preferably be molded with the hook member 8 in synthetic resin. Instead, it may be formed separately from the hook member 8.

An opening lever 9 is pivoted with the second pivot 14 above the striker-engaging groove 71 of the first base member 7, forced in a standby direction or in a clockwise direction in FIGS. 6 and 11-15 by the second spring 15 wound on the second pivot 14 and held in the standby position in which a lower acting portion 91 is positioned downwards in FIGS. 6, 11, 12 and 15.

The acting portion 91 is between the hook member 8 and sensing member 10 and allowed to contact a projection 86 of the hook member 8 when the opening lever 9 rotates anticlockwise from the standby position. When the opening lever 9 is in the standby position, a certain gap is formed not to contact the acting portion 91 with the projection 86 owing to variation of the mounted positions of the hook member 8, striker 5 and other parts.

As mentioned below, based on the operating knob 21 of the operating device 6, the opening lever 9 rotates anticlockwise from the standby position to the first operating position in FIG. 13 to allow the front edge of the acting portion 91 to contact the projection 86 of the hook member 8 to shift the hook member 8 from the engagement position to the first-step unlocking position. The opening lever 9 shifts to the second operating position in FIG. 14 in which it rotates further anticlockwise from the first operating position to allow the hook member 8 to shift to the second-step unlocking position.

The sensing member 10 is pivotally secured on a third pivot 16 above the striker-engaging groove 71 of the first base member 7; forced by a third spring 17 wound around the third pivot 160; and usually held in the standby position in FIGS. 6 and 11 in which the upper front portion contacts a stopper 75 of the first base member 7.

The sensing member 10 has at the lower rear end a contact portion 101 which can go on the first and second engagement portions 51,52 of the striker 5.

The first engagement portion 51 or second engagement portion 52 of the striker 5 engages in the first engagement groove 81 of the hook member 8 to allow the contact portion 101 to go on the first or second engagement portion 51 or 52 to enable the sensing member 10 to shift to a detecting position to which the standby position rotates upwards in FIGS. 12-15.

Then, the operating device 6 will be described. As described in FIG. 4, the operating device 6 is exposed from the shoulder of the seat back 3 and comprises a rectangular guide member 20 in a mounting hole 431a of the mounting bracket 43 and an operating knob 21 which is stored to enable it to slide in the guide member 20 up and down.

The operating knob 21 is connected to a connecting shaft 233 fixed to one end of the bell crank 23 and moved with the bell crank 23 between the first rest position A in which the upper surface is substantially coplanar with the upper surface of the guide member 20 in FIGS. 12 and 15 and the second rest position in which the upper surface is retracted in FIG. 11. According to the passenger, the upper surface of the operating knob 21 is shifted to the first operating position C in FIG. 13 which is retracted further from the second rest position B and the second operating position D in FIG. 14 which is retracted further from the second operating position C.

In the first rest position A, the first or second engagement portion 51 or 52 of the striker 5 engages in the first engagement groove 81 of the hook member and the sensing member 10 is in the detecting position. In the second rest position B, the sensing member 10 is in the standby position and the first and second engagement portions 51,52 disengage from the first engagement groove 81 of the hook member 8. In the first operating position C, the opening lever 9 is moved to the first acting position to allow the hook member 8 to move to the first-step unlocking position. In the second operating position D, the opening lever 9 is moved to the second acting position to allow the hook member 8 to move to the second-step unlocking position.

On the upper inner circumferential surface of the guide member 20, there is an indicator (not shown) comprising a different color from the guide member 20 or letters "UNLOCK". The indicator is hindered when the operating knob 21 is in the first rest position A, while it is exposed when the operating knob 21 is out of the first rest position A thereby allowing the passenger to warn that the locking assembly 4 disengages from the striker 5 to improve security.

The bell crank 23 is pivotally secured on the fourth pivot 22 to the mounting bracket 43 to move up and down, and forced clockwise by a fourth spring 25 wound on the fourth pivot 22 in FIGS. 6 and 11-15. The bell crank 23 is moved together with the operating knob 21 to the first rest position A1 in FIGS. 12 and 15; the second rest position B1 in FIG. 11 to which it rotates anticlockwise from the first rest position AS1; the first operating position C1 in FIG. 13 to which it rotates anticlockwise from the second rest position B1; and the second operating position D1 in FIG. 14 to which it rotates anticlockwise from the first operating position C1.

The force of the fourth spring 25 acting to the bell crank 23 is set to be smaller than the force of the third spring 17 acting to the sensing member 10.

The other end of the bell crank 23 has the first elongate opening 231 and second elongate opening 232 extending vertically.

In the first elongate opening 231, the upper end 24a of the first connecting rod 24 connected at the lower end to the sensing member 10 engages with play to slide up and down. In the second elongate opening 232, the upper end 26a of the second connecting rod 26 connected at the lower end to the opening lever 9 engages with play to slide up and down.

The first elongate opening 231 is set to have a length having a play to the upper end 24a of the first connecting rod 24 corresponding to stroke of the bell crank 23 between the first rest position A1 and the second operating position D1 with respect to anticlockwise rotation of the bell crank 23 when the operating knob 21 and bell crank 23 are in the first rest position A, A1. Thus, motion of the operating knob 21 and bell crank 23 from the first rest position A,A1 to the second operating position D,D1 and vice versa is not transmitted to the sensing member 10.

The second elongate opening 232 is set to have a length having a play to the upper end 26a of the second connecting rod 26 corresponding to stroke of the bell crank 23 between the first rest position A1 and the second rest position B1 with respect to anticlockwise rotation of the bell crank 23 when the bell crank 23 is in the first rest position A1. Thus, motion of the operating knob 21 and bell crank 23 from the first rest position A,A1 to the second rest position B,B1 and vice versa is not transmitted to the opening lever 9.

The operating knob 21 and the bell crank 23 moves from the first rest position A,A1 to the second rest position B,B1 below.

When the sensing member 10 is in the standby position in FIG. 11:

While the upper end 24a of the first connecting rod 24 contacts the upper end of the first elongate opening 231, the operating knob 21 and bell crank 23 are held in the second rest position B,B1. In this case, force of the third spring 17 acting to the sensing member 10 is set to be greater than force of the fourth spring 25 acting to the bell crank 23, so that the bell crank 23 does not rotate clockwise or in the first rest position A1 by the force of the fourth spring 25.

When the sensing member 10 shifts from the standby position to the detecting position from FIG. 11 to FIG. 12 or 15:

The sensing member 10 shifts from the detecting position to the standby position, so that the first connecting rod 24 goes down. Following the motion of the sensing member 10, the bell crank 23 shifts by the force of the fourth spring 25 from the second rest position B1 to the first rest position A1.

When the sensing member 10 shifts from the detecting position to the standby position in FIG. 12 or 15 to FIG. 11

The sensing member 10 shifts from the detecting position to the standby position, so that the first connecting rod 25 goes up to allow the upper end 24a to contact the upper edge of the first elongate opening 231 to press up the bell crank 23. Thus, the bell crank 23 shifts to the second rest position B1 against the force of the fourth spring 25.

Figure 3:
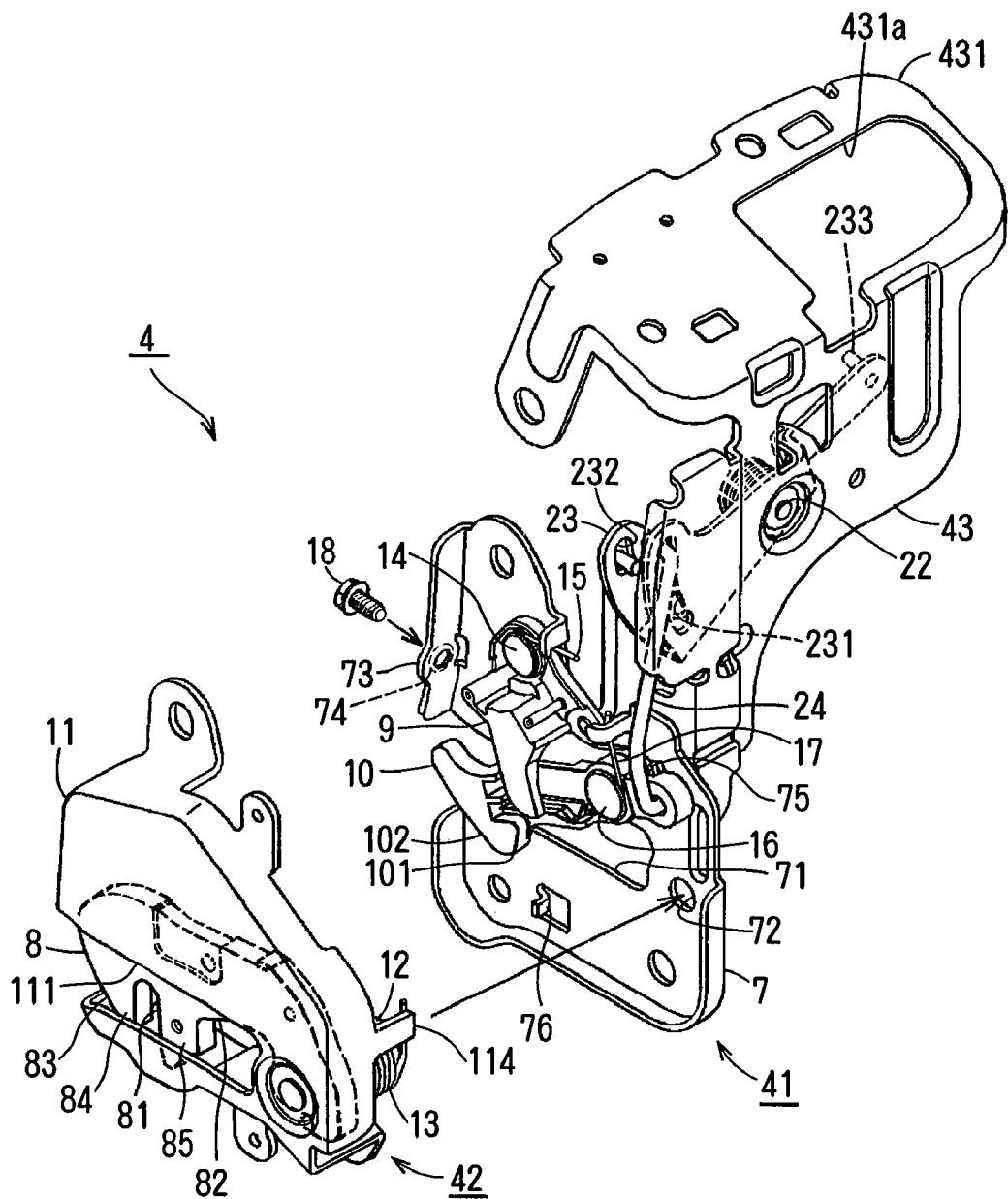
FIG. 3 is a rear perspective view of the locking assembly provisionally assembled.

Then, it will be described how to assemble the locking assembly 4. As shown in FIG. 3, before the first base member 7 is connected to the second base member 11, the first subassembly 41 for the first base member 7 and the second subassembly 42 for the second base member 11 are formed.

The ends of the pivots 14,16 are previously crimped. The opening lever 9 and the sensing member 10 are pivotally connected to the first base member 7 with the pivots 14,16 and the springs 15,17 are connected, so that the first subassembly 41 is formed.

One end of the first pivot 12 or the end which projects from the second base member 11 is crimped and the hook member 8 is pivotally connected to the second base member 11 with the pivot 12. As shown in FIGS. 8 and 9, the hook member 8 is put between the second base member 11 and the larger-diameter portion 121 of the first pivot 12 to enable the hook member 8 to rotate.

Figure 2:
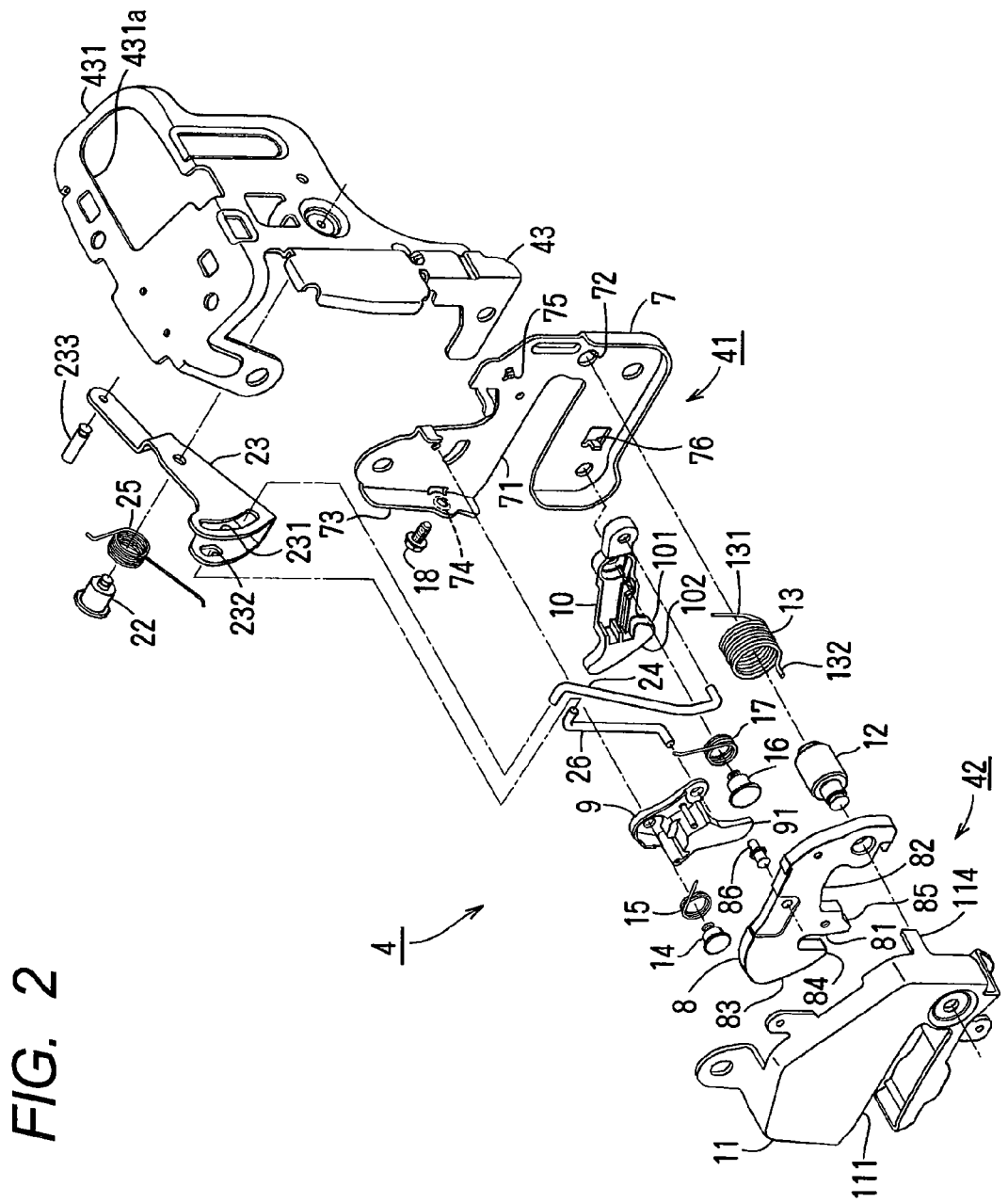
FIG. 2 is an exploded perspective view of a locking assembly.

After the first and second subassemblies 41,42 are formed, a positioning projection 76 of the first base member 7 is engaged in a positioning opening 115 of the second base member 11 and positioned. And the other end of the first pivot 12 is put into an axial hole 72 of the first base member 7 and crimped in FIG. 2. As mentioned above, the first fixing portion 73 is joined to the second fixing portion 112 with a bolt 18 in a direction perpendicular to the pivots 12,14,16. The first subassembly 41 and the second subassembly 42 are previously formed, which results in efficient assembling of the locking assembly 4.

The first base member 7 is connected to the second base member 11 with the bolt 18 at an opening side of the striker-engaging grooves 71,111 with the first pivot 12 at the inner part of the striker-engaging grooves 71,111 thereby preventing deformation around the striker-engaging grooves 71,111 in which load is gathered and improving lock strength.

The hook member 8 is pivotally connected to the second base member 11, and the opening lever 9 and the sensing member 10 are pivotally connected to the first base member 7. Thus, the hook member 8 and the sensing member 10 are arranged in parallel between the first base member 7 and the second base member 11, thereby shortening height of the locking assembly 4. As a result, the locking assembly 4 can be disposed in a narrow space close to the shoulder of the seat back 3. Thus, the locking assembly 4 can be disposed at a position spaced from a hinge shaft at maximum thereby reducing moment acting to the locking assembly 4 and improving support strength of the seat back 3.

The hook member 8 can be disposed closer to the body panel to which the striker 5 is fixed thereby shortening the length of the engagement portions 51,52 and improving locking strength.

The function of the present embodiment will be described:

(i) When the seat back 3 is held in the first standing position in FIG. 12:

The first engagement portion 51 of the striker 5 engages in the first engagement groove 81 of the hook member 8, In this condition, the first engagement portion 51 contacts the receiving edge 8a of the hook member 8.

The contact portion 101 of the sensing member 10 rides on the first engagement portion 51 of the striker 5 to move the detecting position. Thus, the operating knob 21 is held in the first rest position. The passenger visually confirm the first rest position in which the upper surface of the operating knob 21 is coplanar with the upper surface of the guide member 20 thereby easily making sure that the first engagement portion 51 of the striker 5 engages in the first engagement groove 81 of the hook member 8 to allow the seat back 3 to be held surely in the first standing position.

(ii) When the seat back 3 is held in the second standing position in FIG. 15:

The second engagement portion 52 of the striker 5 engages in the first engagement groove 81 of the hook member 8 and the first engagement portion 51 engages in the second engagement portion 82 with play. In this situation, against leaning of the seat back 3, the second engagement portion 52 contacts the receiving edge 8a of the first engagement groove 81. The first engagement portion 51 is spaced apart from the buffer portion 87 in the second engagement groove 82.

The contact portion 101 of the sensing member 10 rides on the second engagement portion 52 to move to the detecting position, thereby holding the operating knob 21 in the first rest position A. Thus, as well as the above (i), it allows the passenger to visually confirm that the second engagement portion 52 engages in the first engagement groove 81 of the hook member 8 so that the seat back 3 may be held in the second standing position.

(iii) When the seat back 3 falls down or when the striker 5 disengages from the hook member 8 of the locking assembly 4 in FIG. 11:

The hook member 8 is held in the standby position by the force of the first spring 13; the sensing member 10 is held in the standby position by the force of the third spring 17; and the bell crank 23 is held in the second rest position B,B1 against the force of the fourth spring 25.

The passenger visually confirms that the upper surface of the operating knob 21 is retracted in the guide member 20 to allow the indicator to be exposed thereby making sure that the striker 5 disengages from the hook member 8 of the locking assembly 4.

(iv) When the seat back 3 is moved from the falling position to the first standing position:

When the seat back 3 stands up from the falling position, the first engagement portion 51 of the striker 5 engages in each of the striker-engaging groove 71,111 to get in touch with the inclined edge 83 of the hook member 8 and the inclined edge 102 at the end of the sensing member 10 to move the hook member 8 upwards from the standby position against the force of the first spring 13, to jump up the sensing member 10 against the force of the third spring 17 and to allow the contact portion 101 on the first engagement portion 51 to move to the detecting position.

Figure 13:
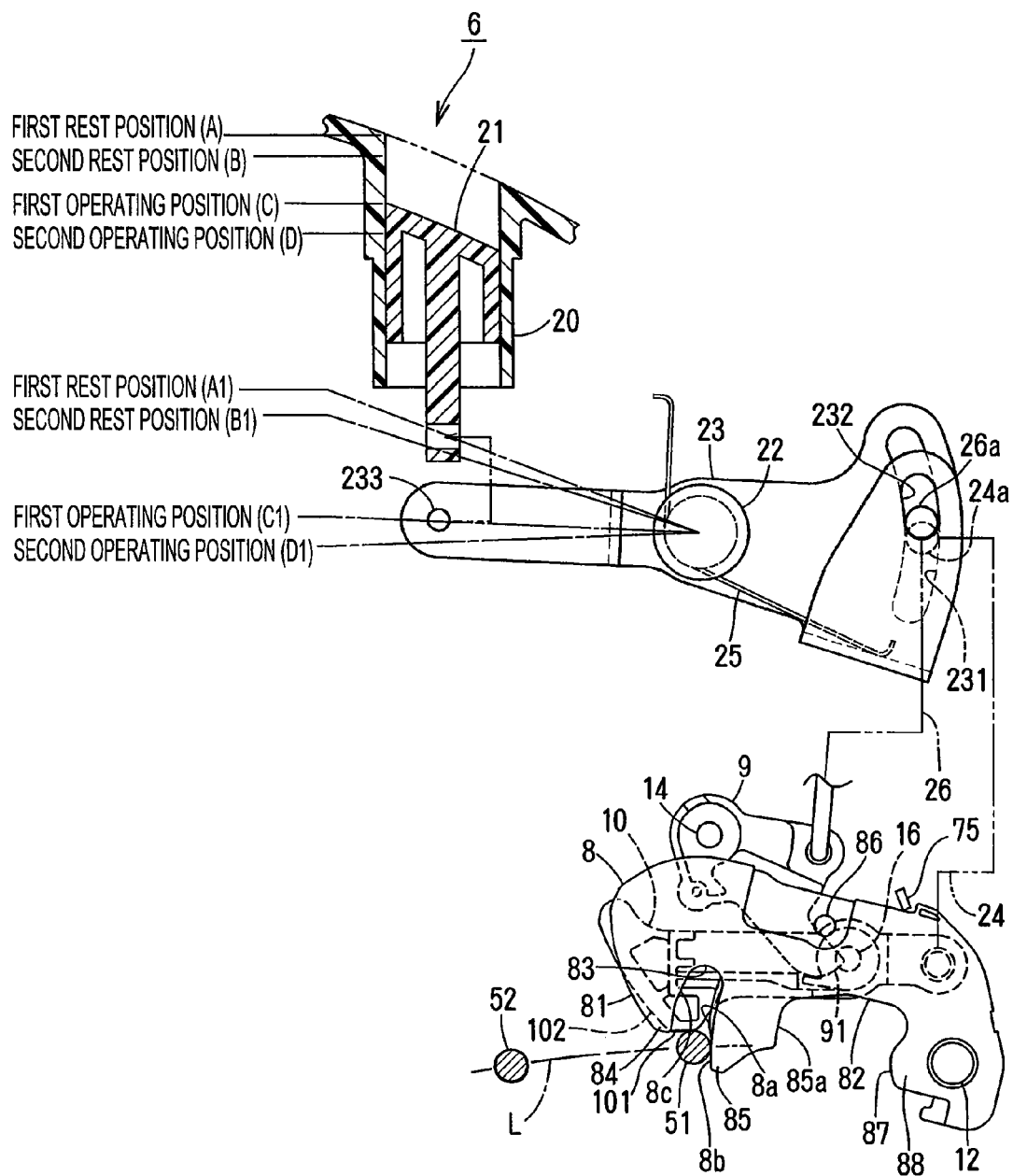
FIG. 13 is a view showing an action of main parts when the operating knob is in the first operating position.

When the first engagement portion 51 contacts the contact portion 8b of the second arm 85 of the hook member 8 in FIG. 13, the seat back 3 rests at the first standing position and the hook member 8 moves to the engagement position by the force of the first spring 13 to allow the first engagement portion 51 of the striker 5 to engage in the first engagement groove 81 in FIG. 12. As a result, the seat back 3 is held in the first standing position and the operating knob 21 moves from the second rest position B to the first rest position A.

When the operating knob 21 moves from the second rest position B to the first rest position A, the bell crank 23 is connected to the opening lever 9 with play corresponding to a moving distance between the second rest position B1 and the first rest position A1 of the bell crank 23. So movement of the operating knob 21 from the second rest position B1 to the first rest position A1 is not transmitted to the opening lever 9. As a result, even though the operating knob 21 moves to the first rest position A, the hook member 8 can be held in the engagement position.

(v) When the seat back 3 is moved from the first standing position to the falling position:

The operating knob 21 is pushed from the first rest position A to the first operating position C. Thus, the bell crank 23 rotates from the first rest position A1 to the first operating position C1 against the force of the fourth spring 25 and the hook member 8 rotates from the standby position to the first-step unlocking position via the second connecting rod 26 and the opening lever 9 in FIG. 13. Thus, the first engagement portion 51 of the striker 5 becomes releasable from the first engagement groove 81. In this situation, the seat back 3 is rotated forwards to move to the falling position.

When the operating knob 21 is pressed in from the first rest position to the first operating position C, the operating knob 21 is joined to the sensing member 10 such that movement of the bell crank 23 between the first rest position A1 and the first operating position C1 is transmitted to the sensing member 10, so that action of the operating knob 21 is not transmitted to the sensing member 10.

When the seat back 3 moves to the falling position, the operating knob 21 is moved to the second rest position and retracted thereby preventing the operating knob 21 from contacting a front sheet (not shown) to damage the surface of the front sheet.

(vi) When the seat back 3 is moved from the first standing position to the second standing position:

As shown in FIG. 14, the operating knob 21 is pressed into the second operating position D to move the bell crank 23 to the second operating position D1. Thus, the hook member 8 is moved to the second-step unlocking position via the second connecting rod 26 and opening lever 9 to enable the first engagement portion 51 of the striker 5 to be released from the first engagement groove 81 of the hook member 8. In this condition, the seat back 3 is pushed rearwards to allow the first engagement portion 51 to engage in the second engagement groove 82 to release the operation of the operating knob 21. As shown in FIG. 15, the hook member 8 is moved to the engagement position by the force of the first spring 13 to allow the second engagement portion 52 to engage in the first engagement groove 81 and allow the first engagement portion 51 to put in the second engagement groove 82 with play.

When the first engagement portion 51 of the striker 5 comes into the second engagement groove 82, the first engagement portion 51 contacts the buffer portion 87 of the hook member 8 moved to second-step unlocking position thereby relieving contacting sound when the seat back 3 stops in the second standing position and determining a position for stopping the seat back 3. As a result, the first engagement groove 81 of the hook member 8 can surely engage with the second engagement portion 52. When the hook member 8 moves to the engagement position, the buffer portion 87 goes away from the first engagement portion 51 and does not bind the first engagement portion 51 thereby allowing the first engagement groove 81 to engage the second engagement portion 52 surely without subjecting to irregularity in size between the first engagement portion 51 and the second engagement portion 52 of the striker 5 and errors in a mounting position of the striker 5 and locking assembly 4.

(vii) When the seat back 3 is moved from the second standing position to the falling position:

Similar to the above (vi), the operating knob 21 is pressed into the second operating position D to allow the hook member 8 to move to the second-step unlocking position, so that the second engagement portion 52 of the striker 5 becomes releasable from the first engagement groove 81 of the hook member 8 and the first engagement portion 51 becomes releasable from the second engagement groove 82 to allow the seat back to fall forwards.

The foregoing merely relate to embodiment of the invention. Various changes and modifications may be made by a person skilled in the art without departing from the scope of claims wherein:

What is claimed is:

1. A vehicle seat lock for a seat attached to a vehicle body, the vehicle seat lock comprising:
   a striker configured to be fixed to the vehicle body and comprising a first engagement portion and a second engagement portion:
   the seat including a seat back, the seat back including a top;
   a first base member fixed in the seat back;

a second base member fixed to the first base member to form a space between the first base member and the second base member;

a hook member pivotally secured between the first base member and the second base member and having a first engagement groove and a second engagement groove selectively engagable with the first engagement portion and the second engagement portion of the striker;

an opening lever pivotally secured between the first base member and the second base member and engaging with the hook member to open the hook member;

a sensing member pivotally secured between the first base member and the second base member to detect invasion of the striker into the hook member;

a bracket fixed in the seat back above the first base member and the second base member;

a bell crank pivotally secured to the bracket;

a first connecting rod connecting the bell crank to the sensing member and having an upper end and a lower end;

a second connecting rod connecting the bell crank to the opening lever and having an upper end and a lower end; and an operating device exposed at the top of the seat back and comprising a lower end coupled to the bell crank.

2. A vehicle seat lock of claim 1, further comprising:

a pivot fixed to the bracket;

a spring wound on the pivot;

the bell crank being secured to the bracket on the pivot, an inner end of the bell crank being coupled to the lower end of the operating device, the bell crank comprising:

a first outer end and a second outer end parallel to the first outer end, the first outer end of the bell crank having a first elongate opening in which the upper end of the first connecting rod slidably engages, the second outer end of the bell crank having a second elongate opening in which the upper end of the second connecting rod slidably engages, the lower end of the first connecting rod being coupled to the sensing member, the lower end of the second connecting rod being coupled to the opening lever.

3. A vehicle seat lock of claim 2, wherein the hook member comprises an inward protrusion configured to engage with the opening lever moving with the hook member upwards to allow the hook member to disengage from the striker by raising the second connecting rod when the bell crank rotates in an anticlockwise direction.

4. A vehicle seat lock of claim 2, wherein the operating device comprises an operating knob at an upper end, the operating knob being coplanar with a top surface of the seat back when the first engagement portion or the second engagement portion of the striker firmly engages in the first engagement groove of the hook member, while the operating knob is retracted downward from the upper end of the seat back when the first engagement portion or the second engagement portion disengages from or does not firmly engage with the first engagement groove.

5. A vehicle seat lock of claim 4, wherein the sensing member rides on the first engagement portion or the second engagement portion of the striker to pull down the first connecting rod to rotate the bell crank in a clockwise direction to allow an upper surface of the operating knob to be coplanar with the top surface of the seat back to provide to an operator visual confirmation of safe engagement of the striker with the hook member.

* * * * *